United States Patent [19]
Senator

[11] Patent Number: 5,829,005
[45] Date of Patent: Oct. 27, 1998

[54] CIRCULAR SIZE-BOUNDED FILE TECHNIQUE FOR A COMPUTER OPERATING SYSTEM

[75] Inventor: Steven T. Senator, Colorado Springs, Colo.

[73] Assignee: Sun Microsystems, Inc., Palo Alto, Calif.

[21] Appl. No.: 675,040

[22] Filed: Jul. 3, 1996

[51] Int. Cl.[6] .................................................. G06F 17/30
[52] U.S. Cl. ......................... 707/100; 707/200; 707/205
[58] Field of Search .................... 707/100, 101, 707/102, 200, 202, 205, 204

[56] References Cited

U.S. PATENT DOCUMENTS

| | | | |
|---|---|---|---|
| 5,023,832 | 6/1991 | Fulcher, Jr. et al. | 364/900 |
| 5,623,654 | 4/1997 | Peterman | 707/206 |
| 5,636,360 | 6/1997 | Courts et al. | 395/472 |

FOREIGN PATENT DOCUMENTS 0 249 090 A2  12/1987  European Pat. Off. ........ G06F 17/30

OTHER PUBLICATIONS

Leffler, McKusick, Karels, Quarterman, *The Design and Implementation of the 4.3BSD UNIX Operating System*, Addison–Wesley Publishing Company, Inc., Ch. 6, "I/O System Overview," pp. 169–186, and Ch. 7, The Filesystem, pp. 187–223, 1989.

Leffler, Samuel J.; McKusick Marshall Kirk; Karels, Michael J.; Quarterman, John S.; *The Design and Implementation of the 4.3BSD UNIX Operating System*, Chapters 6 and 7, Addison–Wesley Publishing Company, 1989.

*Primary Examiner*—Thomas G. Black
*Assistant Examiner*—Donald Min
*Attorney, Agent, or Firm*—Homer L. Knearl; F. A. Sirr; Holland & Hart LLP

[57] ABSTRACT

Apparatus and programmed method is disclosed, providing for the creation of a circular file of use in conjunction with the UNIX™ operating system or other layered and modular operating system architectures. The circular file uses an inode field to identify the file as circular and writes fill data to the file to allocate physical blocks to the file at the time of its creation. Thereafter, blocks already allocated to the file are re-allocated when more file space is needed and the file size does not increase.

4 Claims, 4 Drawing Sheets

CIRCULAR SIZE-BOUNDED FILE TECHNIQUE FOR A COMPUTER OPERATING SYSTEM

BACKGROUND OF THE INVENTION

The present invention relates, in general, to the field of file systems of computer operating systems and more particularly to systems for providing administrative users with a unique file type for efficiently storing audit trails, or "logs", in such file systems.

Many applications of computer systems require that a record of operations be kept in order to keep track of performance, provide for auditing of input/output ("I/O") of data, and otherwise manage and control the integrity of the system. These records of operations are often kept in the form of logs. Examples are message logs which accumulate system and application process messages and error messages. Other examples are print data logs and mail logs in time shared systems serving a large number of users.

A common attribute of each of these log files is that the amount of data that is added to a log file is under control of an administrative end user, or applications running on the same or other computers and therefore the operating system is not able to determine accurately how much data need be stored. Also, since these log files are often used to discover the cause, or recover from a system or application failure, the most recent data is of greater value than the oldest data in the log.

Often the administrative user estimates the rate at which the log file is expected to grow and then adds a contingency factor in order to determine the size to pre-allocate for the sum of all possible log files. However, no mechanism exists to pre-allocate a fixed amount of space per log file.

If the system administrative user miscalculates and specifies cumulative file sizes that are too small for the log files, important current data messages, print data or mail may be lost since there is no more space in the log. If the administrative user specifies conservatively large file sizes for the log files, disk storage may become unavailable as the physical space is used up storing old log data and new physical blocks are un-available for allocation to user or system applications.

"The Design and Implementation of the 4.3BSD UNIX Operating System" by Samuel J. Leffler et al., published by Addison-Wesley Publishing Company in 1989, describes currently available exemplary mechanisms for storing user log data in chapter 7.

SUMMARY OF THE INVENTION

In accordance with the present invention, the above problems of storing logs without specifying too little space and losing current information or specifying too much space and allowing a program to consume all physical file space is solved by the creation of a new circular file type.

The present invention is of particular utility in conjunction with logging file systems in that the latest and most valuable information will always be preserved even when all of the logical file space has been filled. Moreover, although the file is circular, it is nevertheless still randomly accessible and any data stored therein may be accessed in any sequence and customized preening and culling operations are no longer necessary as the space allocation and re-allocation may be handled automatically for all logging applications. Still further, the circular, size-bounded files of the present invention allow for data to be read any number of times and the data read will not be lost until its space is needed for the most current data.

These and other advantages of the present invention are obtained by providing modifications to the file size definition and to physical space allocation modules so as to provide a fixed amount of circular file space in which the latest data is always available and only the oldest and least valuable data is discarded as new data is received for storage in a log.

In accordance with a particular embodiment of the present invention, disclosed herein is a method for use in conjunction with a computer operating system which includes a file system. The computer operating system is effective for executing an application program and a method of storing an unpredictable amount of time valued data into the file system comprises the computer implemented steps of receiving from an administrative application program, an argument indicating that a file is to be created. An index structure is assigned and a file size is set into the index structure. An application program may modify the file type to change it into a circular file. This circular attribute is stored in the index node structure ("inode").

In accordance with another embodiment of the present invention, there is disclosed a method for use in conjunction with a computer having an operating system which includes a file system. The operating system is effective for executing an application program and a method for storing log data into the file system is disclosed which comprises the computer implemented steps of receiving an argument from an application program indicating that data is to be written to a particular file and finding an index structure for the particular file. The method further comprises the steps of noting from a field in the index structure whether the particular file is a circular file, writing the data to the particular file using newly allocated physical data blocks when the particular file is not a circular file and re-allocating a physical block already identified in the index structure when the particular file is a circular file. Data is then written into the physical block along with an end of file indicator.

BRIEF DESCRIPTION OF THE DRAWINGS

The foregoing, and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
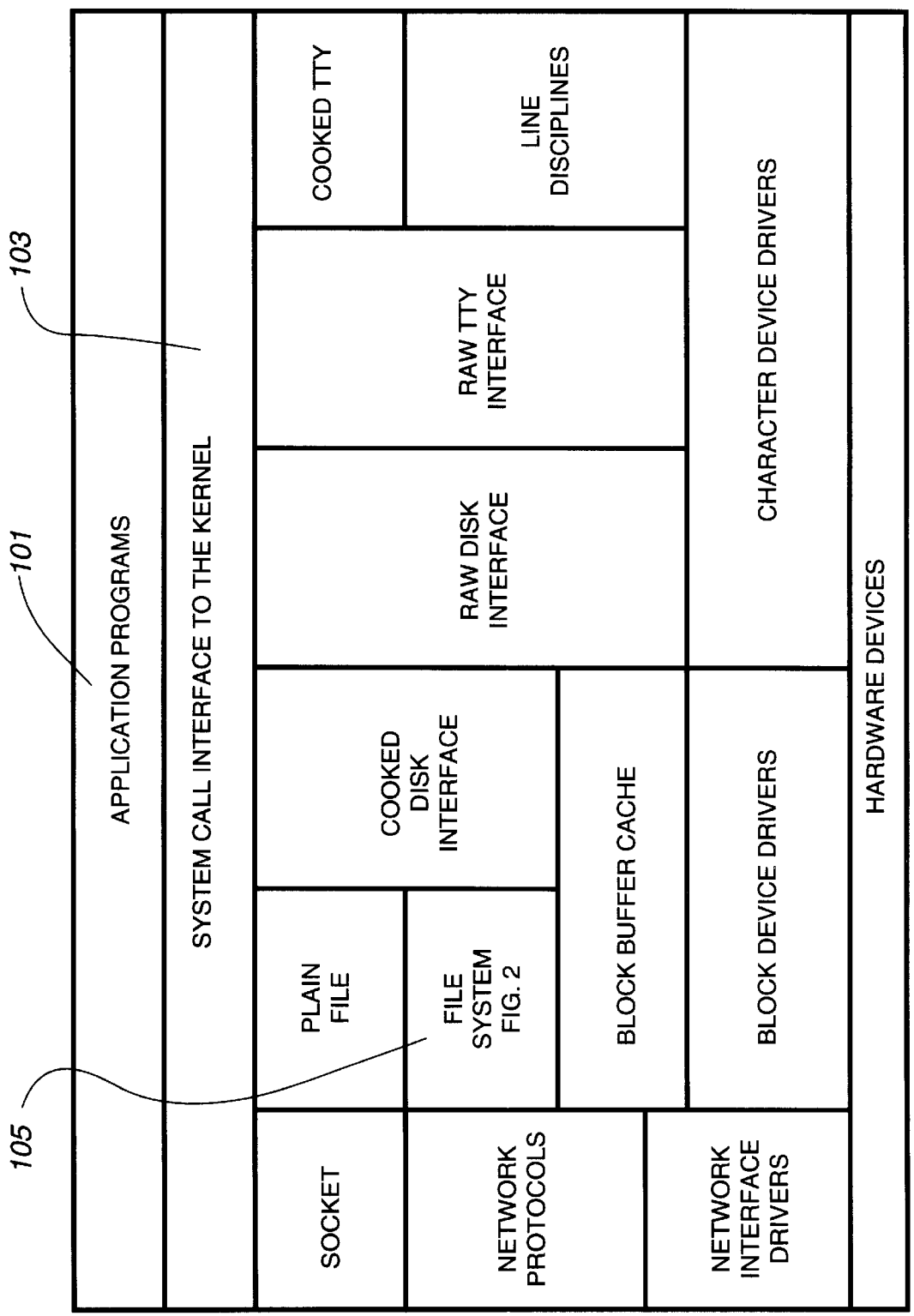
FIG. 1 is representative block diagram illustrating the relationship of an application program to the various levels of the operating system and the media device in accordance with the invention.

The structures and modules by which the invention may be embodied in a UNIX™ example will now be described with respect to FIG. 1. FIG. 1 is a summary of the various prior art systems that are part of a typical UNIX file system. Application programs 101 use the system call interface 103 to call file system functions implemented in file system 105 to perform data storage and retrieval functions which are described in more detail in chapter 6 of the textbook entitled "The Design and Implementation of the 4.3BSD UNIX Operating System" by Samuel J. Leffler et.al from which most of FIG. 1 has been derived. This book was published by Addison-Wesley Publishing Company in 1989 and is hereby incorporated herein by reference. Note that the file system block 105 refers to FIG. 2 wherein the modules and structures of the invention are shown in greater detail.

Figure 2:
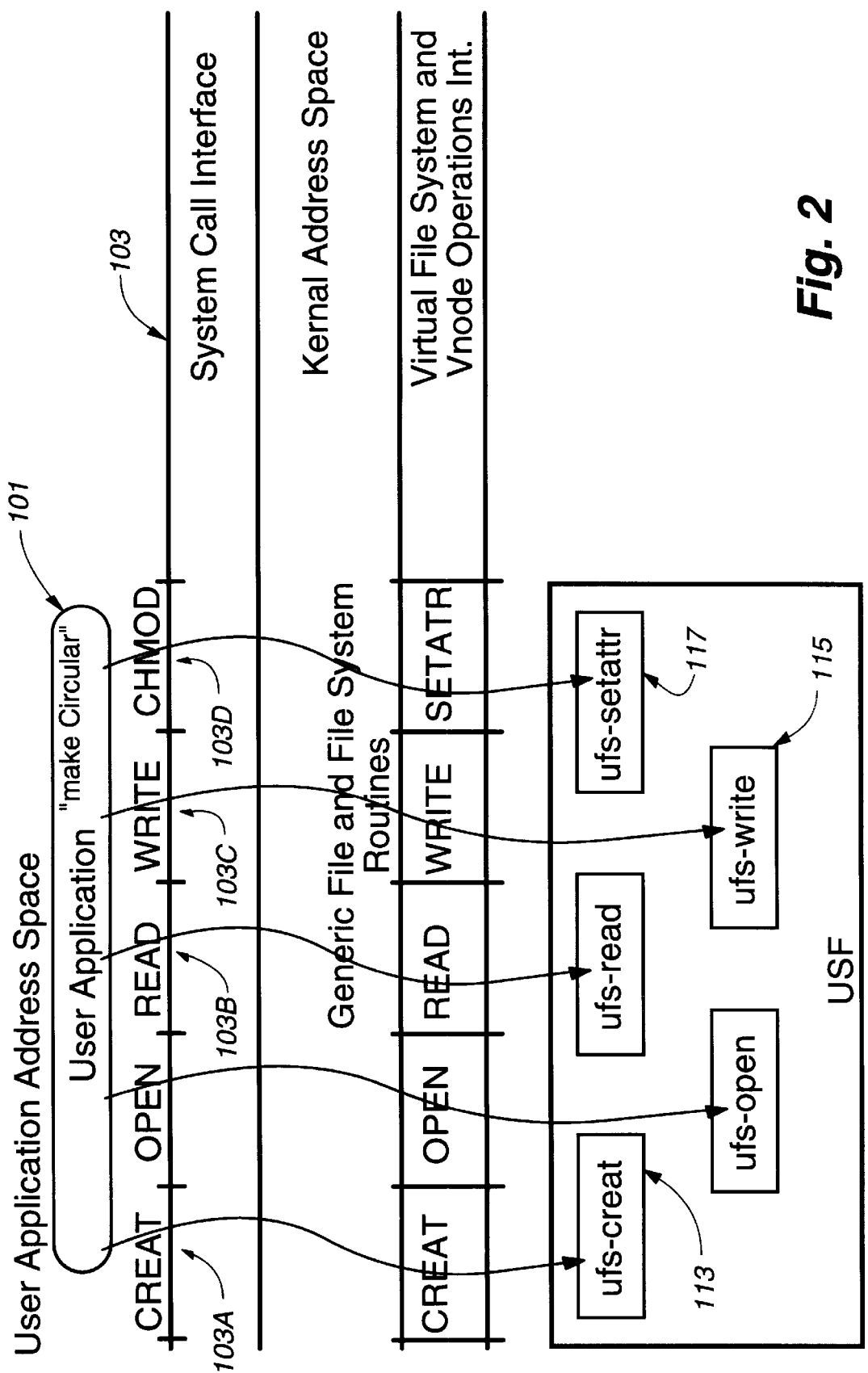
FIG. 2 is a simplified representative illustration of the structure of the file system of FIG. 1 in accordance with a representative embodiment of the invention.

At the top of FIG. 2, a user application 101 that will be generating log data is shown invoking a number of standard file operation system calls. It invokes CREAT 103A to create a file in the normal UNIX manner and this call is passed down to the appropriate file system routine, ufs-creat 113. This provides for the creation of the file as described in previous references such as Leffler et al. The file is then grown to its desired size by repeatedly issuing write calls 103C which are dispatched to ufs-write 115. Finally, the user application invokes chmod 103D to set the new circular attribute of the file. This is passed to the ufs-setattr 117 routine which updates the per-file data structure and the inode (index node structure) to invoke the new circular allocation and re-allocation policies for future read 103B and write 103C operations. This circular file is now ready to be used as a circular file.

Figure 3:
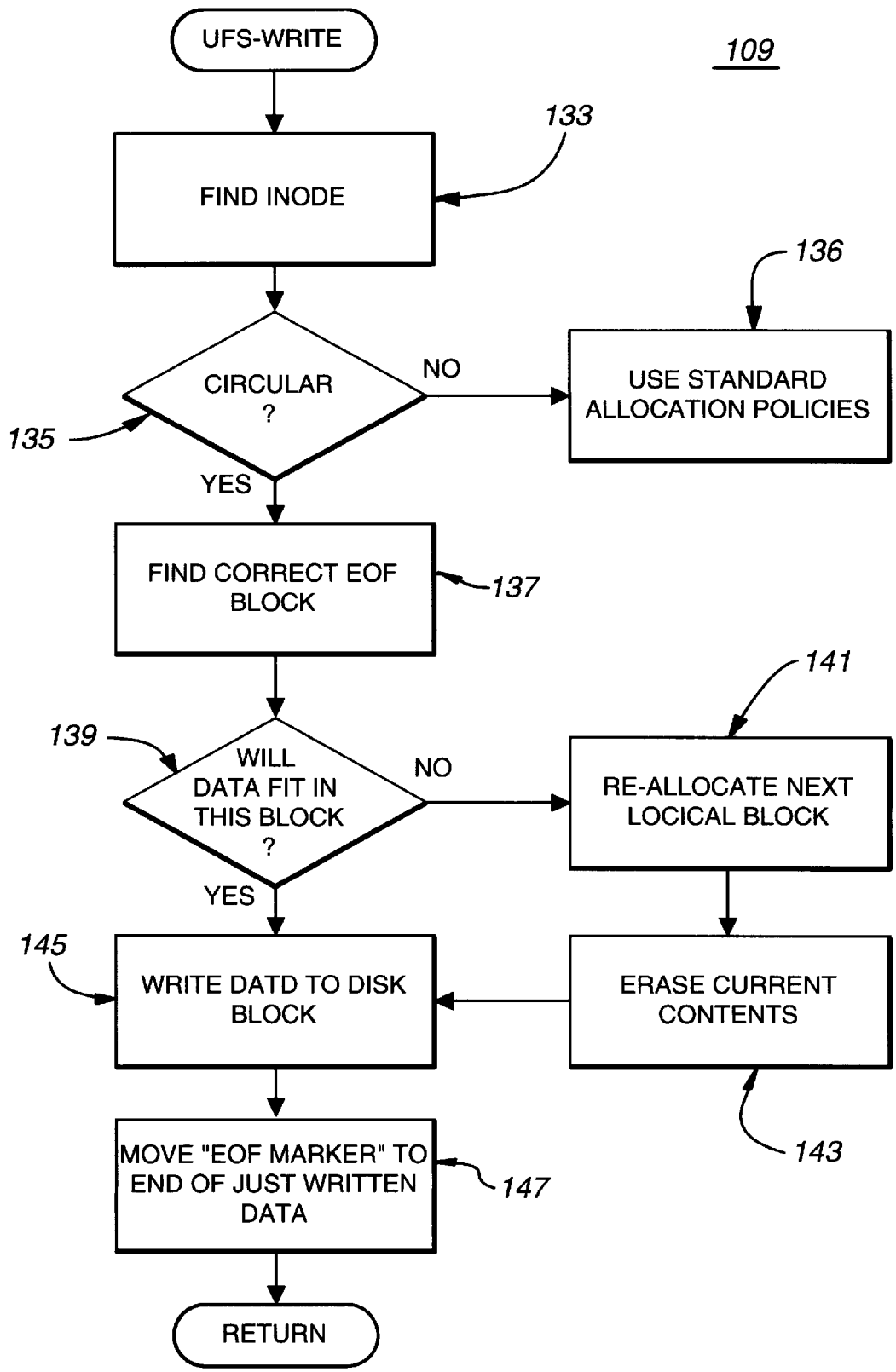
FIG. 3 is a representative logic flowchart of a method in accordance with the present invention.

FIG. 3 shows the portions of the allocate circular module 109 that are operative to re-allocate the physical block that follows the block containing EOF when another block is needed to store current log data. Portion 133 utilizes the generic file system routines to locate the inode, either in the inode table or by reading it in from disk. Portion 135 examines the file type bits and notes whether the file is a circular file. If it is not circular, the generic file system routines complete the write process at portion 136. If the file is circular, the current physical block must be accessed in order to find EOF at portion 137.

If the current physical block still has space, log data is moved to the block buffer at portion 139 and written to disk at portion 145. If after filling the block, current log data still remains to be stored, another block must be allocated by a block mapping routine but not a new block. Instead, at portion 141, the generic allocation BMAP routine described in the Leffler reference at pages 207 and 208 are by-passed and the logical block pointer is moved to the next sequential position and the physical block identified in the block table is re-allocated to the new logical block, and retrieved and erased at portion 143. After erasure, the remaining log data is moved to the buffer at portion 145, the logical EOF marker is updated at portion 147 and it is written to disk or other persistent computer mass storage media.

Figure 4:
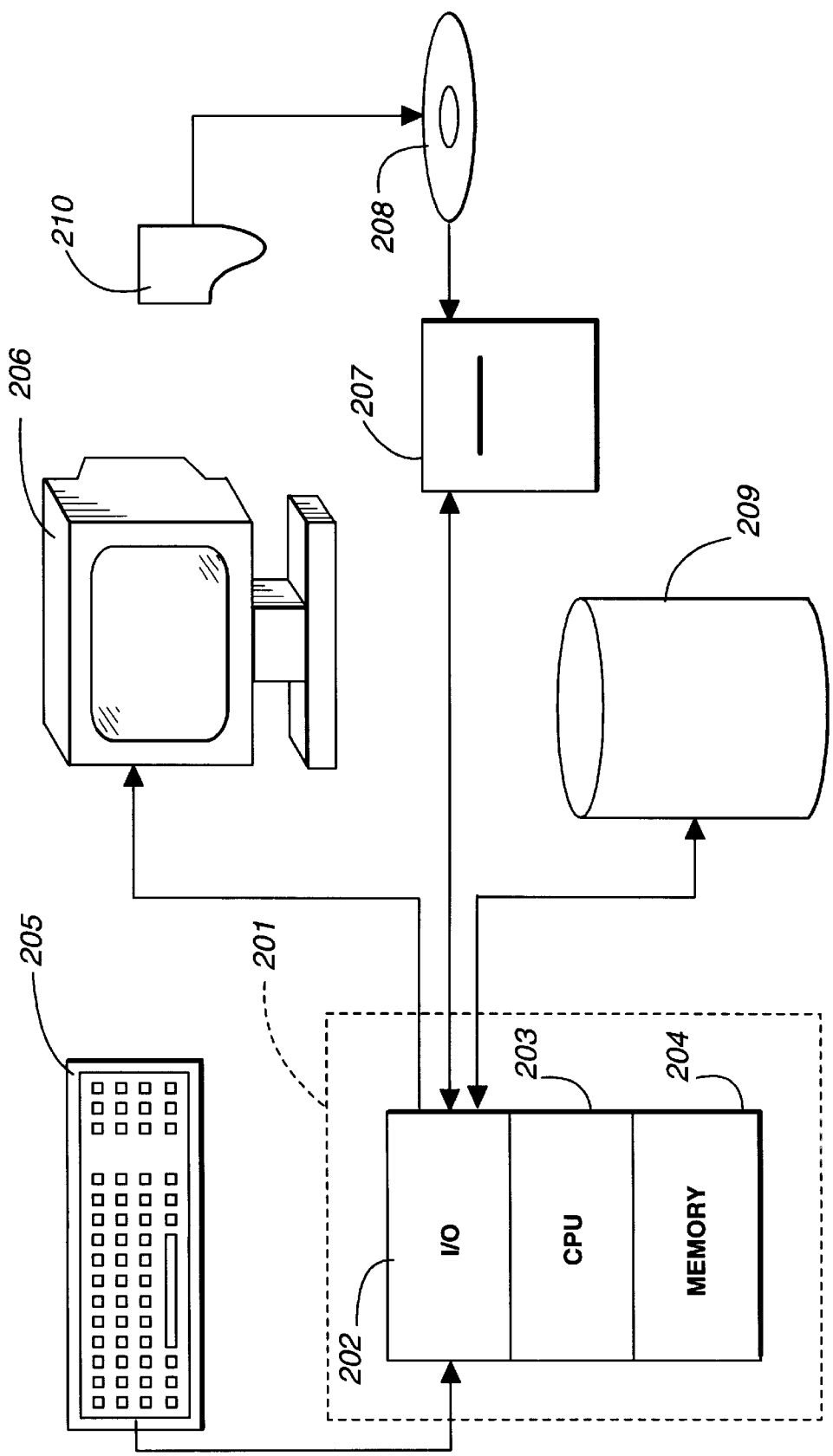
FIG. 4 is a simplified drawing of a general purpose computer forming a portion of the operating environment of the present invention.

The environment in which the present invention finds utility encompasses the general purpose distributed computing system, wherein general purpose computers, workstations or personal computers are connected by communications links of various types, into a client server arrangement, wherein programs and data, many in the form of objects, are made available by various members of the system for access and execution by other members of the system. FIG. 4 shows an exemplary general purpose workstation computer wherein a processor 201 is shown having an I/O section 202, a central processing unit or CPU 203 and a memory section 204. The I/O section 202 is connected to a keyboard 205, a visual display unit 206, a disk storage unit 209 and a compact disk read only memory (CDROM) drive unit 207.

The CDROM unit 207 can read a CDROM medium 208 which typically contains program products 210 as previously described with respect to FIGS. 1 through 3. These computer program products contain mechanisms to effectuate the apparatus and methods of the present invention and may reside in the memory 204, or on the disk storage unit 209, or on the CDROM 208 of such a system.

Having described the invention in terms of a preferred embodiment thereof in a UNIX type architecture, it will be recognized by those skilled in the art of computer system design that various changes in the structure and programming of the implementations described can be made, including the application of the invention in other layered and modular operating system architectures, without departing from the spirit and scope of the invention which is measured by the following claims.

What is claimed is:

1. In a computer having an operating system including a file system, said operating system for executing an application program, a method of storing log data into said file system comprising the computer implemented steps of:

receiving from an application program, an argument indicating that log data is to be written to a particular file;

finding an index structure to the particular file;

noting from a field in the index structure whether the particular file is a circular file;

writing the log data to the particular file using newly allocated physical data blocks when the particular file is not a circular file;

re-allocating a physical data block already identified in the index structure when the particular file is a circular file; and writing the log data into the re-allocated physical data block when the particular file is a circular file.

2. A computer program product comprising:

a computer useable medium having computer readable code embodied therein for causing a computer to store log data into a file system of a computer operating system, the computer readable code comprising:

computer readable program code devices configured to cause a computer to effect receiving from an application program, an argument indicating that log data is to be written to a particular file;

computer readable program code devices configured to cause a computer to effect finding an index structure to the particular file;

computer readable program code devices configured to cause a computer to effect noting from a field in the index structure whether the particular file is a circular file;

computer readable program code devices configured to cause a computer to effect writing the log data to the particular file using newly allocated physical data blocks when the particular file is not a circular file;

computer readable program code devices configured to cause a computer to effect re-allocating a physical data block already identified in the index structure when the particular file is a circular file; and computer readable program code devices configured to cause a computer to effect writing the log data into the re-allocated physical data block when the particular file is a circular file.

3. In a computer operating system for executing an application program, a method of creating a circular file and then storing an unpredictable amount of time valued data into said circular file, comprising the computer implemented steps of:

receiving from an administrative application program an argument for creating a circular file;

assigning an index structure to the circular file;

setting a circular file size into the index structure;

allocating physical blocks to the circular file;

marking an end of file for the circular file;

setting a circular mark into the index structure;

receiving from the application program an argument indicating that data is to be written to a particular file;

finding the index structure for the particular file;

noting from a field in the index structure that the particular file is a circular file;

re-allocating a physical block already identified in the index structure; and writing data from the application program into the re-allocated physical block.

4. A computer program product comprising:

a computer useable medium having computer readable code embodied therein for causing a computer to store an unpredictable amount of time valued data into a file system of a computer operating system, the computer readable code comprising:

computer readable program code devices configured to cause a computer to effect receiving from an administrative application program an argument for creating a circular file;

computer readable program code devices configured to cause a computer to effect assigning an index structure to the circular file;

computer readable program code devices configured to cause a computer to effect setting a file size for the circular file into the index structure;

computer readable program code devices configured to cause a computer to effect allocating physical blocks to the circular file;

computer readable program code devices configured to cause a computer to effect marking an end of file for the circular file;

computer readable program code devices configured to cause a computer to effect setting a circular mark into the index structure; and computer readable program code devices configured to cause a computer to effect writing fill data from the application program into the physical blocks.

\* \* \* \* \*